Nov. 28, 1961  P. D. DILLEY  3,010,736
ROD BRACKET
Filed Jan. 10, 1958  2 Sheets-Sheet 1
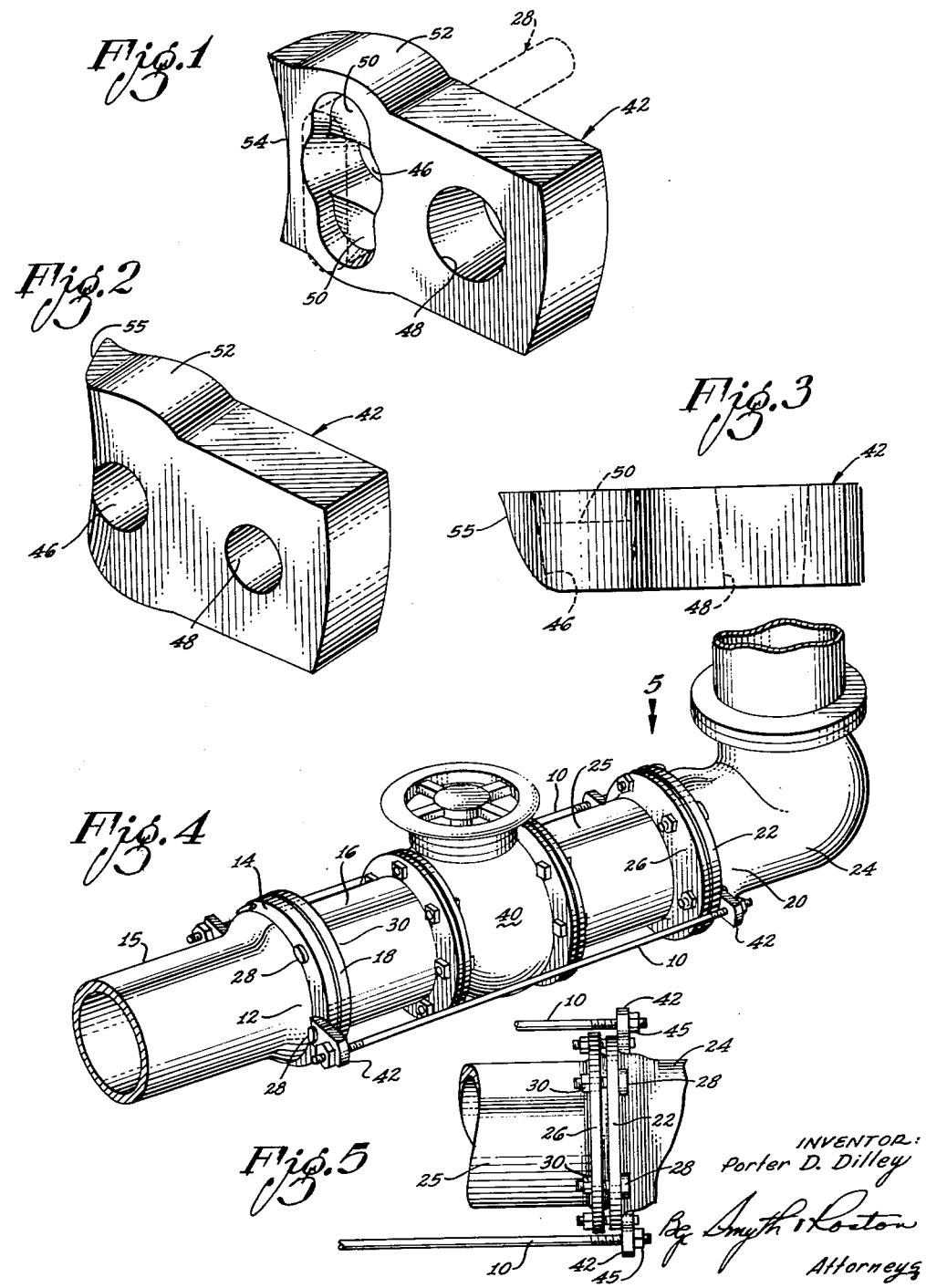
INVENTOR:
Porter D. Dilley
Attorneys

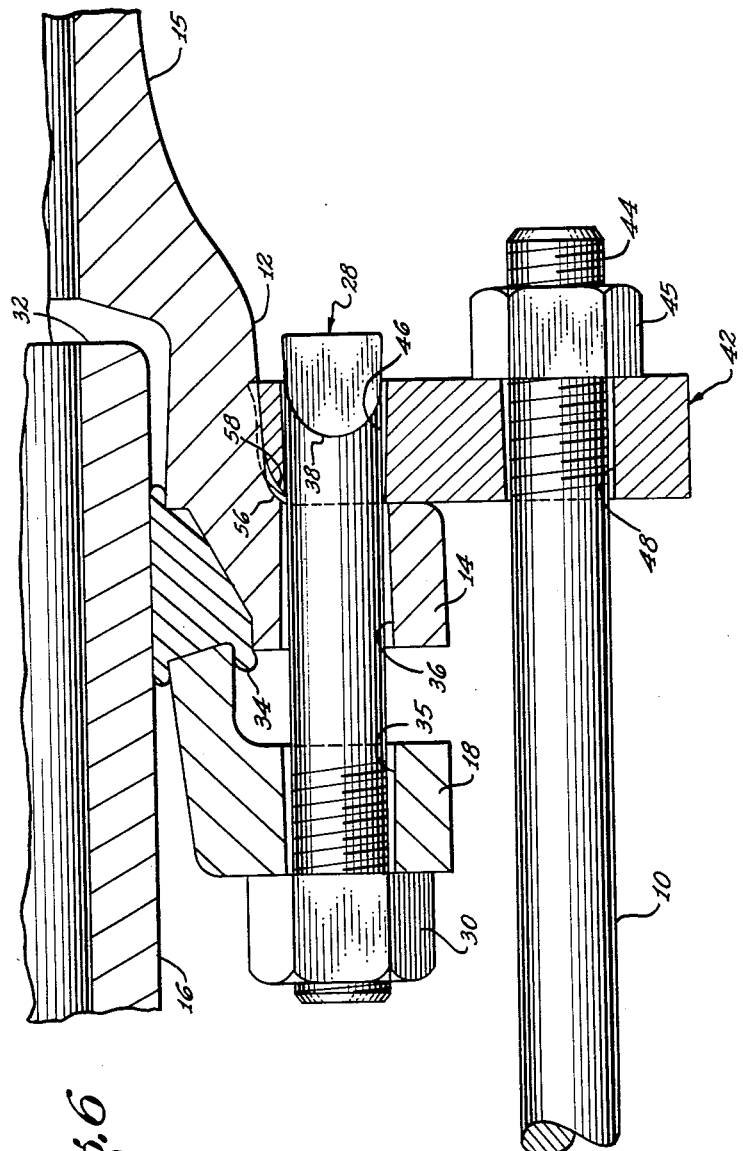

United States Patent Office 3,010,736
Patented Nov. 28, 1961

3,010,736
ROD BRACKET
Porter D. Dilley, 1419 Atchison St., Pasadena, Calif.
Filed Jan. 10, 1958, Ser. No. 708,188
6 Claims. (Cl. 285—114)

This invention relates to standardized cast-iron pipe designed for bell and spigot joints, with special reference to the use of tie rods to oppose the tendency of internal fluid pressure to cause separation at the pipe joints. The invention is directed to the problem of anchoring the ends of such tie rods and one use of the invention is to meet a situation where the tie rods are required to span intervening coupling flanges of such auxiliaries as valves, T-fittings and the like.

A mechanical joint in an installation of standardized cast-iron pipe comprises a flanged bell formed on the end of one pipe component, a spigot or plain end of the adjacent pipe component telescoped into the bell, a packing ring interposed between the bell and spigot, a flanged gland follower abutting the packing ring and, finally, a series of bolts interconnecting the flange of the pipe bell and the flange of the gland follower. The bolts act in tension on the gland follower to exert sufficient pressure on the packing ring to seal the joint.

The series of bolts prevents separation movement between the gland follower and the pipe that is formed with the bell end but the bolts do not connect the two pipe components themselves, i.e. the pipe component having the bell end and the adjacent pipe component having the spigot end. Consequently, tie rods are required to act across the bell and spigot joints. A pair of diametrically opposite longitudinal tie rods is sufficient for cast-iron pipe of relatively small diameter.

If none of the pipe components along the length of the tie rods extend laterally beyond the circle defined by the bolts that act on the gland follower, the tie rods are simply substituted for corresponding bolts. Thus it is common to employ a pair of tie rods between two spaced bell and spigot joints to prevent separation of the parts at both of the joints, the two tie rods replacing corresponding bolts at the two joints. The tie rods are suitably threaded and provided with nuts to engage the gland followers at the two joints in the same manner as the bolts that they replace.

Where a valve or some other usually wide pipe component is installed between the two joints connected by the tie rods, the tie rods must be spaced outwardly sufficiently to bypass such obstructions for which reason tie rods cannot be substituted for the bolts customarily used in clamping the gland follower to the bell flange. In such instances, clamp assemblies commonly are used to anchor the opposite ends of the tie rods. The use of clamp assemblies for this purpose has been prevalent ever since mechanical joints in cast-iron pipe lines were first widely adopted in the early 1920's, notwithstanding the many disadvantages to which such assemblies are subject.

A clamp assembly for use with two diametrically opposite tie rods comprises two half circle clamp bar segments that are bolted together to embrace the cast-iron pipe. The two half circle bars are formed with end ears to receive bolts for interconnecting the two segments and what may be termed anchorage bodies are mounted on the clamp bolts to receive and anchor the ends of the tie rods. In the larger pipe sizes more than two tie rods are used because the pressure that tends to separate the parts at the joints depends on the cross-sectional area of the pipe and therefore increases with the square of the diameter of the pipe. If eight tie rods, for example, are to be used for a pipe line of relatively large diameter, a clamp bar assembly for use with the eight tie rods is divided into eight segments which are bolted together with eight anchorage bodies at the junctures of the eight segments.

If the two clamp assemblies at the opposite ends of the tie rods embrace the corresponding pipe components in abutment against pipe bells, a single pair of clamp assemblies may be used effectively to anchor the ends of the tie rods. In other instances, where no pipe bells are available for abutment, a pair of spaced clamp assemblies may be used for each of the individual tie rods so that the loads on the clamp assemblies are unbalanced with consequent tendency for the clamp assemblies to cant and bind on the pipe in a manner to prevent slippage along the pipe. In those instances twice as many clamp assemblies are required for a given set of tie rods. Thus, four unbalanced clamp assemblies instead of two balanced clamp assemblies are required for such an installation of two tie rods.

One disadvantage of using balanced clamp assemblies is that the reaction thrust of each clamp assembly is against a bell of a pipe and the clamp assemblies make only line contact with the bell. One consequence is high concentration of the stresses involved. A much more serious disadvantage is that the flared surface of a pipe bell permits a clamp assembly to cock or cant out of coaxial alignment with the cast-iron pipe. Even with the greatest care to keep the tension forces balanced in the tightening of two tie rods on opposite sides of a pipe, too often one of the clamp assemblies will suddenly cant to swing through an arc of one or two inches and the force involved in the swinging movement is of such high magnitude as to be hazardous. Workers are commonly injured in this manner.

Another disadvantage of using segmental clamp assemblies is the number of parts required. Even the simplest clamp assembly comprises two clamp segments, two bolts, two nuts and two anchorage bodies. Another disadvantage is that whereas the cast-iron pipe itself is highly resistant to corrosion, the clamp assembly components are made of steel and therefore are highly susceptible to corrosion. The segments, the bolts and the nuts of the clamp assemblies are all made of corrosion-vulnerable steel, only the anchorage bodies being made of cast-iron. It is necessary to coat all such steel components with a viscous protective material such as a tar-base asphalt to prevent corrosion and it is difficult to reach all of the exposed steel surfaces for this purpose after the tie rods are assembled.

The present invention provides simple rod bracket castings that extend radially outward from the mechanical joints for anchoring the ends of the tie rods. The cast-iron rod brackets are anchored in place by the usual bolts normally employed in clamping the gland follower to the associated bell. Thus each bolt that secures a rod bracket in place serves two functions, namely, its normal primary function in the mechanical joint and the additional function of anchoring one end of the corresponding tie rod. The bolts hold the cast-iron rod brackets snugly against the faces of the pipe flanges at the mechanical joints so that the rod bracket become, in effect, rigid radial extensions of the pipe flanges. Each rod bracket derives strength from the pipe flange on which it is mounted.

It may be readily appreciated that the use of rod brackets in this manner eliminates the above mentioned disadvantages inherent in the conventional use of clamp assemblies. A pair of cast-iron rod brackets replaces a number of parts. Even in a simple instance where only two tie rods are used, a pair of the cast-iron rod brackets of the invention eliminates the two clamp segments, two anchorage bodies, two steel bolts and two steel nuts. Where unbalanced clamp assemblies would ordinarily be required, a pair of cast-iron rod brackets of the invention replaces fourteen parts.

The elimination of the steel components eliminates the possibility of the corresponding parts deteriorating by corrosion and correspondingly reduces the necessity of using viscous coating material to combat corrosion. The coating of the tie rods with the protective material is a simple matter when the tie rods are anchored by rod brackets.

One of the unexpected advantages of the invention is that the tensioning of the tie rods increases the tensioning of the corresponding bolts that anchor the corresponding rod brackets. Since the same bolts act on the gland follower to create pressure against the packing ring at the mechanical joint, the use of the rod brackets increases the pressure on the packing ring. This advantage is especially important in the larger pipe sizes where high magnitude pressure against the packing rings is required.

There is a second use for the invention in that it may be employed to eliminate the necessity for using nut spacers at the ends of the tie rods and the necessity of providing long threads on the tie rods. Thus where it is not necessary to position the tie rods radially outward to clear a relatively wide pipe component, it has been customary to substitute tie rods for some of the T-bolts of the mechanical joints. Since the pipe flange at the bell of a joint is of insufficient radial dimension for a conventional hexagonal nut on the end of a tie rod, it is necessary in those instances to employ a nut spacer or spacer sleeve on the tie rod to position the nut clear of the pipe bell. Each tie rod must have an exceptionally long screw thread to receive a second nut for abutment against the packing gland follower, the second nut being necessary because the tie rod is substituted for a T-bolt. The present invention, however, makes it possible to use rod brackets instead and thus positions the tie rods radially outward. Thus the invention in this second use makes it possible to avoid the use of nut spacers and the consequent requirement for providing relatively long screw threads on the ends of the tie rods. The elimination of the long screw threads is highly desirable not only because it reduces the labor of threading the tie rods but also because the threading of the tie rods increases their vulnerability to corrosion.

The features and advantages of the invention may be understood by reference to the following detailed description together with the accompanying drawings.

In the drawings, which are to be regarded as merely illustrative:

FIGURE 1 is a perspective view of the presently preferred embodiment of the rod bracket of the invention showing in phantom how a T-bolt engages the rod bracket;

FIGURE 2 is a perspective view from the opposite side of the rod bracket;

FIGURE 3 is a side elevation of the rod bracket;

FIGURE 4 is a perspective view of a portion of an installation of cast-iron pipe incorporating a pair of tie rods anchored by means of rod brackets in accord with the invention;

FIGURE 5 is a fragmentary plan view of the installation at one end of the two tie rods, the point of view being indicated by the arrow 5 in FIGURE 4; and FIGURE 6 is a fragmentary sectional view of a rod bracket and associated components in an installation.

The problem that is met by the invention may be understood by considering an installation of standardized cast-iron pipe that is shown in FIGURE 4. The installation includes two mechanical joints that are spaced a substantial distance apart and are interconnected by a pair of tie rods 10 to prevent separation of the parts at the two mechanical joints as well as to prevent separation of mechanical joints that lie between the interconnected mechanical joints.

One of the two interconnecting mechanical joints comprises: a bell or bell enlargement 12 and an end flange 14 of a cast-iron pipe component 15; the corresponding spigot end of an adjacent pipe component 16; and a packing gland follower 18. In like manner, the other of the two interconnected mechanical joints comprises: a bell 20 and an end flange 22 of a cast-iron pipe component 24; the spigot end of a cast-iron pipe component 25; and a packing gland follower 26. In each of these two mechanical joints, the pipe flange and the corresponding packing gland follower are interconnected by T-bolts 28 and nuts 30.

The structure at each of the bell and spigot joints may be further understood by reference to the enlarged fragmentary section shown in FIGURE 6. FIGURE 6 shows how the previously mentioned cast-iron pipe component 15 is formed with a bell 12 and an end flange 14. The spigot end 32 of the adjacent cast-iron pipe component 16 telescopes into the bell 12 and is surrounded by a packing ring 34 that is wedged between the spigot end and the bell. The packing gland follower 18 is in pressure contact with the packing ring 34 as shown.

The packing gland follower 26 has a circular series of bolt holes 35 and the pipe flange 14 has a corresponding circular series of bolt holes 36. These bolt holes 35 and 36 are aligned with each other in pairs and one of the T-bolts 28 extends through each pair to draw packing gland follower 18 towards the pipe flange 14 for the purpose of placing the packing ring 34 under sealing pressure. T-bolts are employed because there is limited room for bolt heads around the enlarged bell 12. The inner surfaces of the heads of the T-bolts 28 are rounded as shown at 38 in FIGURE 6 and the bolt holes 35 and 36 are slightly oversized for the purpose of preventing the T-bolts from being stressed in flexure.

In the installation shown in FIGURE 4 a valve 40 is of larger radial dimension than the rest of the structure and extends laterally into alignment with the bolt holes 35 and 36. Consequently, the valve 40 constitutes an obstruction that would prevent the mounting of the tie rods 10 in the bolt holes in substitution for corresponding T-bolts 28. In accord with the teaching of the invention, a pair of rod brackets 42 is mounted on the pipe flange 14 by a corresponding pair of the T-bolts 28 and a second pair of rod brackets 42 is mounted on the pipe flange 22 in similar manner by T-bolts 28 to anchor the opposite ends of the two tie rods 10. The tie rods are positioned radially outwardly far enough by the rod brackets to clear the valve 40. As best shown in FIGURE 6, each end of each tie rod 10 is provided with a screw thread 44 for engagement by a hexagonal nut 45 that abuts the corresponding rod bracket 42.

As may be seen in FIGURES 1, 2 and 3, the cast-iron rod bracket 42 of the invention is a flat elongated body of somewhat rectangular configuration having an aperture 46 adjacent what may be termed its inner end to receive a T-bolt 28 and having a second aperture 48 adjacent what may be termed its outer end to receive a tie rod 10. Preferably the aperture 46 is enlarged in diametrically opposite directions at one of its ends to form a recessed seat 50 on each side of the aperture to receive the head of a T-bolt 28. Each of these recessed seats has a bottom that is curved to conform to the previously mentioned curved inner surfaces 38 of the T-bolt head. Since the provision of the recessed seats 50 reduces the amount of metal of the rod bracket 42 in the region of the aperture 46, preferably the rod bracket is increased in width adjacent the aperture 46 so that the rod bracket configuration bulges on its opposite edges as indicated at 52 in FIGURES 1 and 2. The two apertures 46 and 48 are slightly oversized with respect to the corresponding T-bolts and tie rods and, preferably, are tapered as indicated in FIGURE 3, the purpose of the taper being simply to facilitate the casting of the rod bracket bodies.

The inner end of a rod bracket 42 is curved laterally to conform in a general way with the circumferential curvature of the bell portion of a cast-iron pipe component, this curvature being clearly shown at 54 in FIGURE 1. The rod bracket 42 is also preferably tapered at its inner end to conform in a general manner with the slope or taper of the bell, this taper being clearly apparent at 55 in FIGURES 2 and 3.

It is also to be noted that in the preferred practice of the invention the inner end of a rod bracket 42 conforms in a general manner to the curvature at the root of the pipe flange 14 adjacent the bell 12. As may be seen in FIGURE 6, the cast-iron pipe is formed with what may be termed a transition fillet 56 of curved cross-sectional configuration at the root of the flange 14, and what may be termed the heel 58 of the rod bracket is of curved cross-sectional configuration to conform in a general manner to the curvature of the transition fillet. The inner end of the rod bracket 42 cannot be dimensioned for snug contact with the transition fillet 56 and the pipe bell 12, however, because there is a certain range of dimensional variation among cast-iron pipe components and for the further reason that a rod bracket is shaped and dimensioned for use with cast-iron pipes of a wide range of diameters.

The manner in which the invention serves its purpose may be readily understood from the foregoing description. Wherever a rod bracket 42 is desired for anchoring the end of a tie rod 10, the rod bracket is engaged by a corresponding T-bolt 28 in the manner best shown in FIGURE 6. It may be seen in FIGURE 6 that the rod bracket 42 lies flat against the face of the pipe flange 14. When the nut 30 on the T-bolt 28 is tightened to the usual degree as required for exerting sealing pressure on the packing ring 34, the T-bolt 28 is placed under more than enough longitudinal tension to hold the rod bracket 42 snug against the face of the pipe flange 14 with no freedom whatsoever for the rod bracket to rock relative to the face of the pipe flange in response to the tension of the tie rod 10. The fact that the two recessed seats 50 are curved to fit the curvature 38 of the head of the T-bolt 28 and the further fact that the rod bracket aperture 46 is slightly oversized with respect to the T-bolt eliminates any possibility of the rod bracket stressing the T-bolt in flexure.

It is apparent that the rod brackets 42 are economical since they are inexpensive to produce and may be cast with sufficient accuracy to require no machining or other finishing operations. The rod brackets are further economical in that a pair of the rod brackets replaces a number of parts of a conventional clamp assembly as heretofore pointed out. The rod brackets 42 are economical for the further reason that they save substantial time and labor in the installation of tie rods.

A further important advantage of the rod brackets 42 is that they are as immune to corrosion as the cast-iron pipe itself. Thus the rod brackets afford further economy in reducing the areas that must be covered with a protective coating to prevent corrosion.

My description in specific detail of the presently preferred practice of the invention will suggest various changes, substitutions and other departures from my disclosure within the spirit and scope of the appended claims.

I claim:

1. An article of manufacture comprising a rod bracket adapted to anchor the end of a tie rod in a cast-iron pipe installation wherein mechanical pipe joints include pipe flanges having bolt holes with bolts mounted therein and wherein the installation includes a laterally enlarged component that requires placing the tie rod at a position spaced radially outward from longitudinal alignment with the bolt holes, said rod bracket comprising an elongated cast-iron body for positioning against a face of one of said flanges with the body extending radially outward beyond the flange, said body having an aperture near one end for engagement by a bolt extending through a bolt hole of the pipe flange to anchor the body to the flange and having a second aperture near its other end to receive the end of the tie rod for anchorage of the tie rod, said apertures having axes parallel and located substantially medially of the bracket, said first mentioned aperture being enlarged at one of its ends to form a rounded seat for the head of a T-bolt that is part of the mechanical pipe joint, the inner end of said body adjacent said first mentioned aperture being tapered and curved to conform to the tapered curvature of a pipe bell adjacent the flange and being further formed with a curved heel to conform generally to the curvature of a transition fillet at the base of the pipe flange, said body being enlarged in width adjacent said first mentioned aperture to compensate for the weakening of the body by the provision of the rounded seat.

2. In combination, that improvement in reinforcing means for high pressure fluid conduit systems utilizing a pair of flanged bell and spigot joints of standard mechanical design located to either side of an intervening conduit fitting having coupling flanges with outer diameters corresponding generally to the diameters of said flanged bells, the bells of said pair of joints facing toward one another and being of the type having gland follower rings held compressed against resilient packing for said joint by clamping bolts extending through said rings and the associated bell flange; a plurality of parallel tie rods threaded at their opposite ends and disposed laterally beside said conduit system and extending transversely of said bell flanges and the coupling flanges of said intervening fitting, separate high strength rigid anchor bracket means for the opposite ends of each of said tie rods, one end of said anchor bracket means having an opening seating therein one of said follower ring clamping bolts and cooperating to hold said bracket means to the bell flange, the other end of said anchor bracket means having an opening for receiving the adjacent end of one of said tie rods, and nut means on the threaded ends of said rods cooperable with said anchor bracket means and effective to place said rods in tension when tightened.

3. The combination defined in claim 2 characterized in that said tie rods are substantially equally spaced from one another circumferentially of said conduit system and lie parallel to the axis of the adjacent portion thereof.

4. The combination defined in claim 2 characterized in that said rigid anchor bracket means are disposed axially beside the axially remote radial faces of the bell flanges being compressed toward one another by the tensioning of said tie rods.

5. The combination defined in claim 2 characterized in that the face of said anchor bracket means in contact with the juxtaposed surface of a conduit bell is complemental in shape thereto whereby tightening of the clamping bolt holding the same to the bell flange serves to bring these complemental surfaces into high-pressure wide-area contact.

6. The combination defined in claim 2 characterized in that the first-mentioned opening through said anchor means is recessed at one end to provide a close fitting seat for a T-headed clamping bolt, and wherein said clamping bolts have T-heads formed to seat in said recesses.

References Cited in the file of this patent

UNITED STATES PATENTS

| | | |
|---|---|---|
| 575,577 | Smith | Jan. 19, 1897 |
| 762,929 | McCullock | June 21, 1904 |
| 765,484 | Hockstein | July 19, 1904 |
| 769,131 | Dillenburg | Aug. 30, 1904 |
| 896,163 | Schmidt | Aug. 18, 1908 |
| 1,118,451 | Sloper | Nov. 24, 1914 |
| 1,155,664 | Lambert | Oct. 5, 1915 |
| 1,366,955 | Schneible | Feb. 1, 1921 |

(Other references on following page)

UNITED STATES PATENTS

| | | |
|---|---|---|
| 1,415,938 | Lott | May 16, 1922 |
| 1,671,789 | Smith | May 29, 1928 |
| 1,873,620 | Moore | Aug. 23, 1932 |
| 1,889,133 | Pfefferle | Nov. 29, 1932 |
| 1,896,062 | Berry | Feb. 7, 1933 |
| 1,995,042 | Powers | Mar. 19, 1935 |
| 2,317,598 | Francois | Apr. 27, 1943 |
| 2,538,186 | Boucher | Jan. 16, 1951 |
| 2,635,643 | Hamer | Apr. 21, 1953 |
| 2,861,822 | Risley | Nov. 25, 1958 |
| 2,885,226 | Mueller | May 5, 1959 |

UNITED STATES PATENT OFFICE
CERTIFICATE OF CORRECTION

Patent No. 3,010,736                 November 28, 1961

Porter D. Dilley

It is hereby certified that error appears in the above numbered patent requiring correction and that the said Letters Patent should read as corrected below.

Column 1, line 46, for "usually" read -- unusually --; column 2, line 47, for "assemblied" read -- assembled --.

Signed and sealed this 24th day of July 1962.

SEAL)
Attest:

ERNEST W. SWIDER
Attesting Officer

DAVID L. LADD
Commissioner of Patents